(12) United States Patent  
Steiner et al.

(10) Patent No.: US 9,191,438 B2  
(45) Date of Patent: Nov. 17, 2015

(54) METHODS AND APPARATUS FOR IDENTIFYING PEERS ON A PEER-TO-PEER NETWORK

(75) Inventors: Moritz M. Steiner, Red Bank, NJ (US); Matteo Varvello, Port Monmouth, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 301 days.

(21) Appl. No.: 12/894,328

(22) Filed: Sep. 30, 2010

(65) Prior Publication Data

US 2012/0084429 A1 Apr. 5, 2012

(51) Int. Cl.
*G06F 15/173* (2006.01)
*H04L 29/08* (2006.01)

(52) U.S. Cl.
CPC ........ *H04L 67/1046* (2013.01); *H04L 67/1061* (2013.01); *H04L 67/1068* (2013.01); *H04L 67/1063* (2013.01)

(58) Field of Classification Search
CPC ............ H04L 67/1046; H04L 67/1068; H04L 67/1051; H04L 67/1065; H04L 67/1063; H04L 67/1061
USPC ......................................... 709/223, 224, 225
See application file for complete search history.

(56) References Cited

U.S. PATENT DOCUMENTS

| 8,051,161 | B2 * | 11/2011 | Hu et al. ........................ 709/223 |
| 2002/0147810 | A1 * | 10/2002 | Traversat et al. ............ 709/224 |
| 2002/0184357 | A1 * | 12/2002 | Traversat et al. ............ 709/223 |
| 2004/0088412 | A1 * | 5/2004 | John et al. ..................... 709/226 |
| 2004/0249953 | A1 * | 12/2004 | Fernandez et al. ............ 709/227 |
| 2010/0064049 | A1 * | 3/2010 | Magharei et al. ............. 709/229 |
| 2010/0138511 | A1 * | 6/2010 | Guo et al. ...................... 709/207 |
| 2010/0146092 | A1 * | 6/2010 | Hu et al. ........................ 709/223 |
| 2010/0274664 | A1 * | 10/2010 | Fernandez Gutierrez . 705/14.45 |
| 2011/0026504 | A1 * | 2/2011 | Feinberg ....................... 370/338 |
| 2011/0307538 | A1 * | 12/2011 | Rimac et al. .................. 709/202 |
| 2012/0079031 | A1 * | 3/2012 | Matthews et al. ............. 709/206 |

OTHER PUBLICATIONS

'Steiner et al., "A Global View of KAD", In Proceedings of the ACM Internet Measurement Conference (IMC), pp. 117-122, San Diego, US (2007).
Steiner et al., "Actively Monitoring Peers in KAD", In Proceedings of the 6th Int'l Workshop on Peer-to-Peer Systems (IPTPS), Bellevue, WA, USA (2007).

* cited by examiner

*Primary Examiner* — Dhairya A Patel
(74) *Attorney, Agent, or Firm* — Ryan, Mason & Lewis, LLP (57) ABSTRACT

Methods and apparatus are provided for identifying participants in a peer-to-peer network, such as an Ares™ network. Peers are identified by sending a bootstrap request message to at least one peer; receiving a response from the at least one peer to the bootstrap request, wherein the response identifies one or more additional peers; and repeating the sending and receiving steps for the one or more additional peers until the bootstrap response satisfies one or more predefined criteria. The predefined criteria can be that the bootstrap response does not identify at least one new peer within a predefined period of time, or that the bootstrap response does not identify at least one new peer at all. The bootstrap requests are generally sent only to peers that have not been previously contacted. The bootstrap request message may comprise, for example, only one packet and requests that the recipient identify a predefined number of random peers. A list of identified peers can be presented to a user, for example, based on one or more demographic criteria.

20 Claims, 6 Drawing Sheets

PEER DATABASE - 300

| IP ADDRESS | PORT | DHT IDENTIFIER |
|---|---|---|
| 69.90.203.72 | 58617 | 4b0c22c514e54ad5fd28aee32fcac07b2ba52bb9 |
| 24.209.176.63 | 21886 | 34f26d8a790ba69672073e676f04ac2e29e51604 |
| ... | ... | ... |
| 220.231.43.11 | 14093 | a760d9ebfc3f42bdb768a32e7747b1ed44201df9 |

METHODS AND APPARATUS FOR IDENTIFYING PEERS ON A PEER-TO-PEER NETWORK

FIELD OF THE INVENTION

The present invention relates generally to user identification techniques and, more particularly, to methods and apparatus for identifying the participants in a peer-to-peer network.

BACKGROUND OF THE INVENTION

Peer-to-Peer (P2P) applications partition tasks among peers. Peers make a portion of their resources, such as processing power, storage or network bandwidth, available to other network participants. Peer-to-peer applications were popularized by file sharing systems, such as the Napster™ file-sharing system and the BitTorrent™ file-sharing system. In a peer-to-peer file sharing model, one or more users (referred to as "peers") share a file with other users. Peers are said to form a peer-to-peer network of nodes.

Due to the distributed nature of P2P networks, there is typically no central information about the network participants. P2P file sharing networks, for example, typically do not require coordination by centralized servers to list the content that is available in the P2P network. A Distributed Hash Table (DHT) is often used in P2P networks to distribute the directory database among all participating clients. Kademlia is a popular DHT. See, for example, Petar Maymounkov and David Mazieres, "Kademlia: A Peer-to-Peer Information System Based on the XOR Metric," International Workshop on Peer-To-Peer Systems (2002). Kademlia is currently implemented in several P2P clients, such as Ares™ (http://aresgalaxy.sourceforge.net and http://www.official-ares.com), eMule (www.emule-project.net) and BitTorrent™ (www.bittorrent.com).

Peer-to-peer file sharing systems are typically primarily employed for personal use. In addition, a significant portion of the shared content is copyright protected. It has been found that many users of peer-to-peer file sharing systems stay connected only for the time required to download the desired content. Thus, the user population of these peer-to-peer systems is highly dynamic, with peers frequently joining and leaving the network. It is therefore challenging to obtain a complete list of the users that are connected to the P2P network at a given time.

A need therefore exists for methods and apparatus that identify the participants (for example, by their IP addresses) that are executing a P2P client on their computer at a given time.

SUMMARY OF THE INVENTION

Generally, methods and apparatus are provided for identifying participants in a peer-to-peer network, such as an Ares™ P2P network. According to one aspect of the invention, peers are identified by sending a bootstrap request message to at least one peer; receiving a response from the at least one peer to the bootstrap request, wherein the response identifies one or more additional peers; and repeating the sending and receiving steps for the one or more additional peers until the bootstrap response satisfies one or more predefined criteria. The predefined criteria comprises, for example, that the bootstrap response does not identify at least one new peer within a predefined period of time, or that the bootstrap response does not identify at least one new peer at all.

In one exemplary embodiment, the bootstrap requests are sent only to peers that have not been previously contacted. The bootstrap request message may comprise, for example, only one packet and requests that the recipient identify a predefined number of random peers.

The IP address, port and identifier for each identified peer are optionally recorded. A further aspect of the invention optionally presents a list of identified peers to a user, for example, based on one or more demographic criteria.

A more complete understanding of the present invention, as well as further features and advantages of the present invention, will be obtained by reference to the following detailed description and drawings.

DETAILED DESCRIPTION

The present invention provides methods and apparatus for identifying the participants in a P2P network, such as an Ares P2P network, at a given time. According to one aspect of the invention, a peer identification process 200 is provided, as discussed further below in conjunction with FIG. 2, that transmits a bootstrap request message to known peers. The response to each bootstrap request includes a list of additional known peers. The exemplary peer identification process 200 continues until no new peers are identified. In this manner, the disclosed peer identification process 200 can identify the participants in a P2P network.

Figure 1:
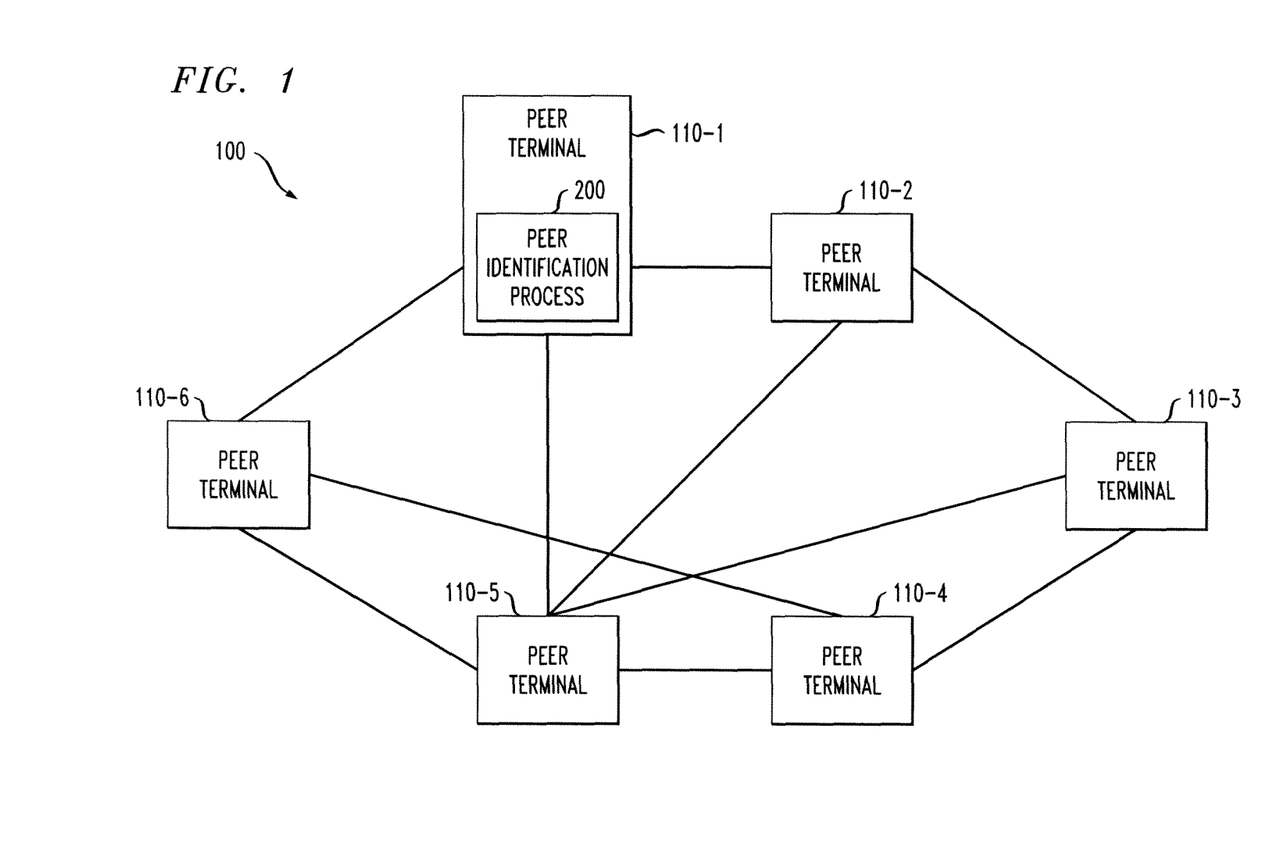
FIG. 1 illustrates an exemplary P2P network environment in which the present invention can operate.

FIG. 1 illustrates an exemplary P2P network environment 100 in which the present invention can operate. Generally, the exemplary P2P network environment 100 comprises a plurality of peer terminals 110-1 through 110-6, without any central infrastructure. As previously indicated, the peer terminals 110-1 through 110-6 are connected to form a P2P network of nodes. The exemplary P2P network environment 100 may be embodied, for example, as an Ares™ network.

One peer participating in the P2P network 100 generally needs to be known (or created) in order to start the crawl in accordance with the present invention. For example, the "seed" peer could be a peer maintained for the purpose of identifying other peers or a peer that was discovered in previous crawls. In the exemplary embodiment of FIG. 1, peer 110-1 is the "seed" peer that executes the peer identification process 200.

Figure 2:
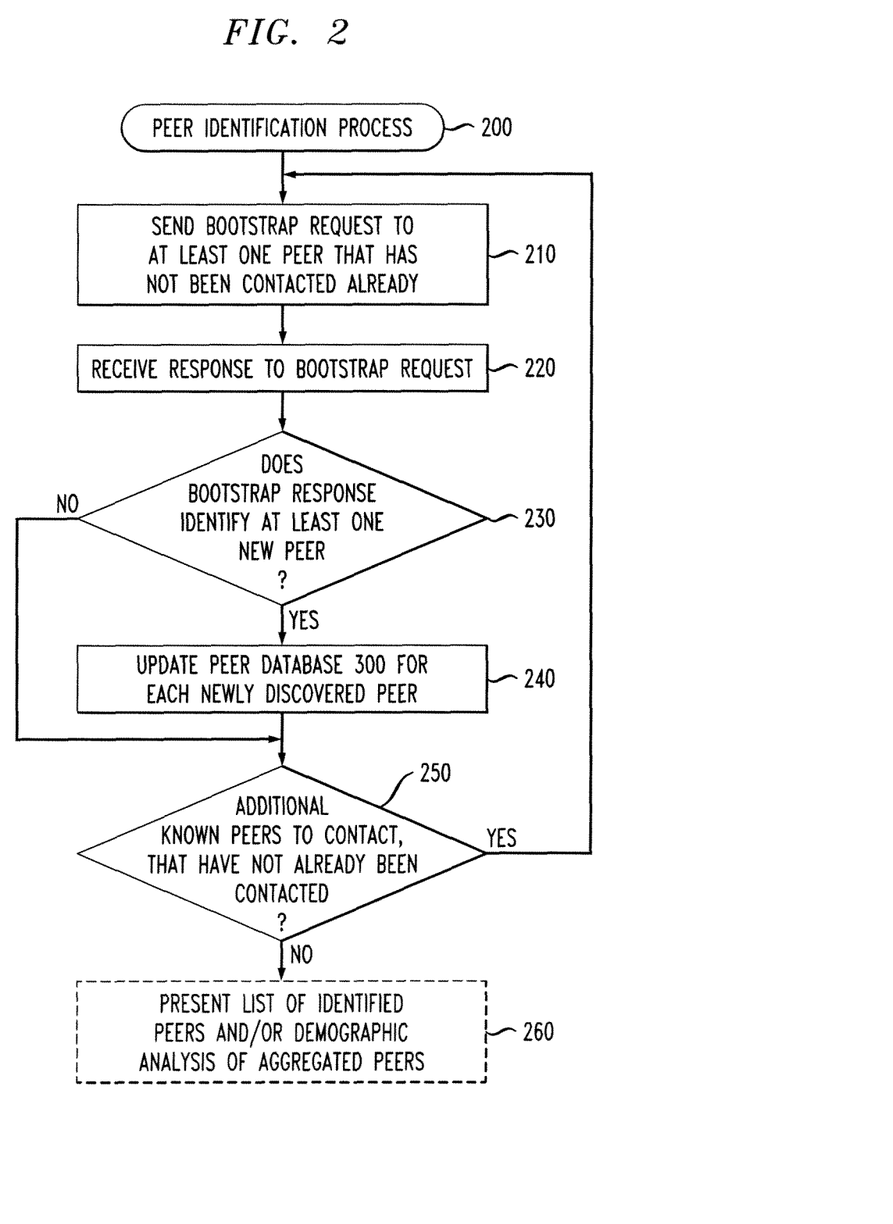
FIG. 2 is a flow chart describing an exemplary implementation of the peer identification process that incorporates features of the present invention.

FIG. 2 is a flow chart describing an exemplary implementation of the peer identification process 200 that incorporates features of the present invention. Generally, the peer identification process 200 enumerates the participants in a P2P network 100 by crawling the network 100. As shown in FIG. 2, the exemplary peer identification process 200 initially sends a bootstrap request message during step 210 to at least one peer that has not already been contacted by the peer identification process 200. Preferably, the peer identification process 200 sends only one packet (the bootstrap request) to every peer.

In the exemplary Ares™ P2P network 100, the bootstrap request asks the recipient to identify a predefined number of random peers, such as 25 random peers. In the exemplary Ares™ P2P network 100, the bootstrap request is typically only used by peers that join the network and know very few peers. The exemplary bootstrap message comprises a UDP packet containing 27 bytes. The first byte identifies the message as an Ares™ message (having a value of 0xE9); the second byte indicates that the message is a bootstrap request (having a value of 0x50). The remaining bytes in the message describe the requester, with 16 bytes for the DHT identifier, 4 bytes for the IP address, 2 bytes for the UDP port and 2 bytes for the TCP port, the last byte is set to 0.

The response to the bootstrap request is received during step 220. The response to the exemplary bootstrap request contains a list of known peers. The first byte of the exemplary response message is again 0xE9, the second byte identifies the bootstrap response message (0x51.) The third and fourth bytes contain the number of peers returned in that message (typically 25). The 4 bytes are followed by 25 bytes per peer (DHT identifier, IP address, UDP port, TCP port, "0"). The message is terminated with 25 peers describing the answering peer, the peer the bootstrap response comes from.

Figure 3:
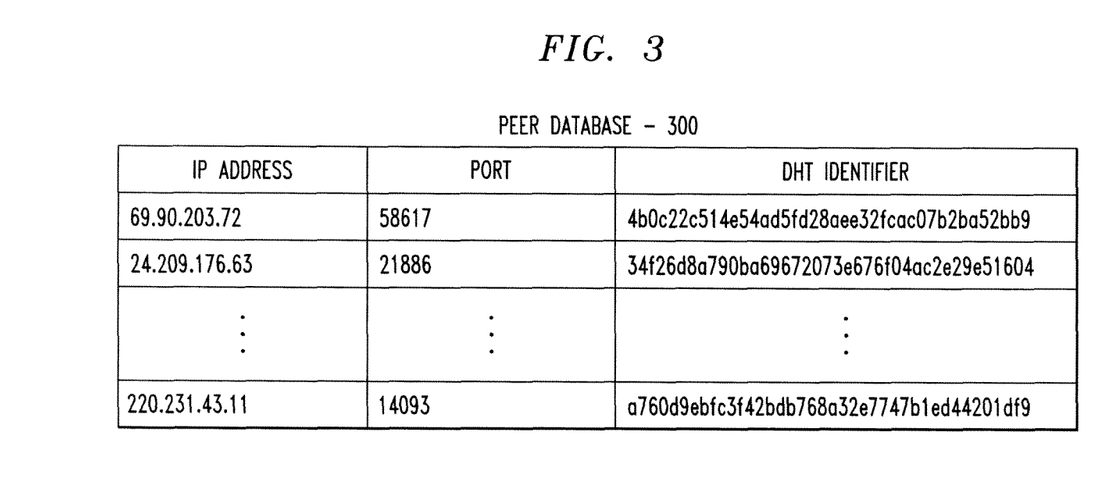
FIG. 3 is a sample table of an exemplary peer database.

A test is performed during step 230 to determine if the bootstrap response identifies at least one new peer. If it is determined during step 230 that the bootstrap response identifies at least one new peer, then a peer database 300, discussed further below in conjunction with FIG. 3, is updated for each newly discovered peer during step 240. Generally, for every peer discovered, the IP address, the port and the DHT identifier are stored in the peer database 300. In this manner, all peers in the bootstrap response that were not previously known are added to a list. If, however, it is determined during step 230 that the bootstrap response does not identify at least one new peer, then program control proceeds to step 250.

A test is performed during step 250 to determine if there are additional known peers to contact, that have not already been contacted. If it is determined during step 250 that there are additional known peers to contact, that have not already been contacted, then program control returns to step 210 to contact the new peers and continues in the manner described above. In this manner, more bootstrap requests are sent out to the peers that have not been queried so far, until bootstrap messages are sent to all peers in the peer database 300.

If, however, it is determined during step 250 that there are no additional known peers to contact, that have not already been contacted, then the crawl is terminated. The crawl stops once the entire graph has been explored and all known peers have been queried (once). In the exemplary embodiment, the sending and receiving processes are not synchronized. If, for a certain time period, no more peers have been added to the peer database 300, the crawl is completed.

Once the crawl is complete the peer identification process 200 optionally presents a list of identified peers during step 260 and/or a demographic analysis of the aggregated peers, as discussed further below in conjunction with FIGS. 5 and 6.

The goal of the peer identification process 200 is to perform the full crawl as quickly as possible, since peers are joining and leaving the P2P network 100 all the time. If the crawl is too slow, it may never terminate, since the joining rate of new peers may be higher than the discovering rate of the crawler.

It is noted that the peer identification process 200 can advantageously identify Peers behind a network address translator (NAT)/Firewall. In particular, peers behind a NAT/Firewall will be identified on the lists of 25 peers returned by one or more other peers. It is noted, however, that the peer identification process 200 will then send a request to the newly discovered peer, but not receive a response because of the NAT/Firewall.

While FIG. 2 shows an exemplary sequence of steps, it is also an embodiment of the present invention that the sequence may be varied. Various permutations of the algorithm are contemplated as alternate embodiments of the invention.

FIG. 3 is a sample table of the peer database 300. As previously indicated the exemplary peer identification process 200 updates the peer database 300 for each newly discovered peer during step 240. Generally, as shown in FIG. 3, for every discovered peer, the peer database 300 records the IP address, the port and the DHT identifier. As previously noted, the information recorded in the peer database 300 is obtained from the responses to the bootstrap request.

Figure 4:
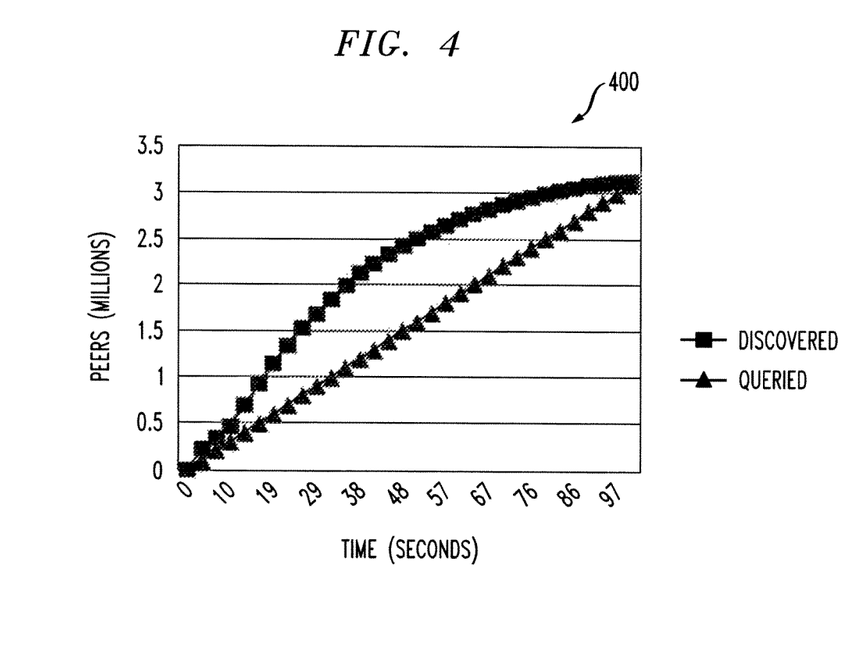
FIG. 4 is a graph indicating the number of peers identified by the exemplary peer identification process of FIG. 2 over time.

FIG. 4 is a graph 400 indicating the number of peers identified by the exemplary peer identification process 200 over time. As shown in FIG. 4, in the beginning of the crawl performed by the peer identification process 200, most peers contained in the responses to the bootstrap requests are going to be unknown, resulting in an exponential increase of known peers. Later during the crawl, many peers in the response messages are known already, therefore, the growth of the number of discovered peers will decrease. The number of discovered peers then asymptotically approaches the number of total peers in the network, as shown in FIG. 4.

As previously indicated, the peer identification process 200 optionally presents a demographic analysis of the aggregated peers. For example, the IP addresses of the identified peers can be looked up in a commercially available database, in order to retrieve one or more of the country, the state, the city, the provider of these IP addresses. This data can be aggregated.

Figure 5:
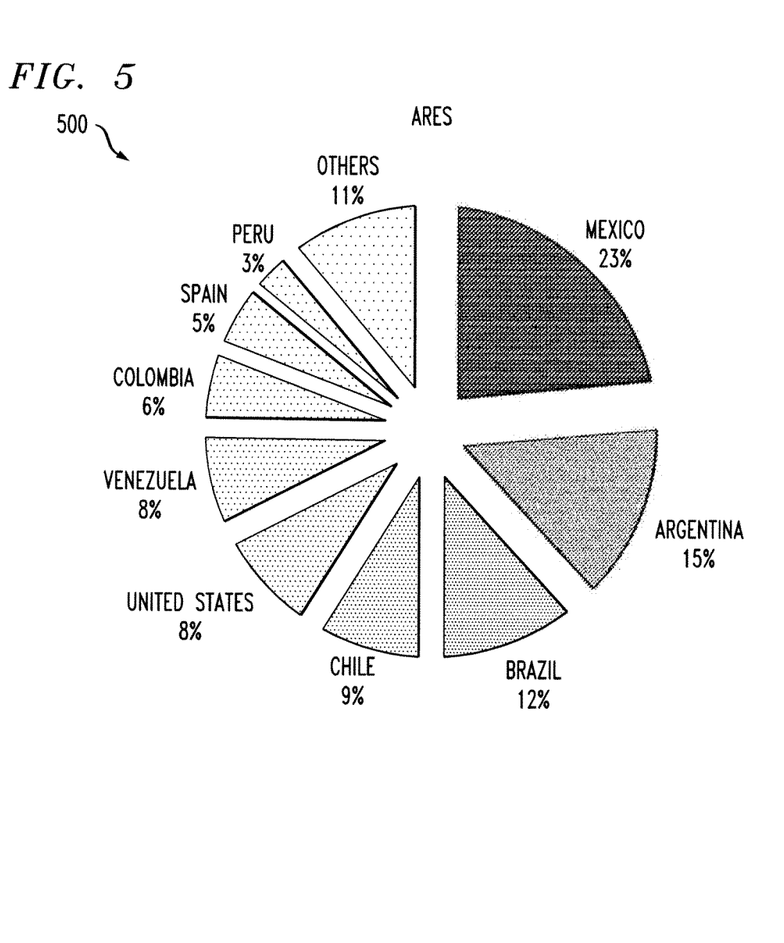
FIGS. 5 and 6 illustrate exemplary analyses of the identified peers, based on the country of the identified peers and the Internet Service Provider (ISP) of the identified peers, respectively.

FIG. 5 illustrates an exemplary analysis 500 of the identified peers, based on the country of the respective peers. In particular, FIG. 5 illustrates the percentage of identified peers that are from each country.

Figure 6:
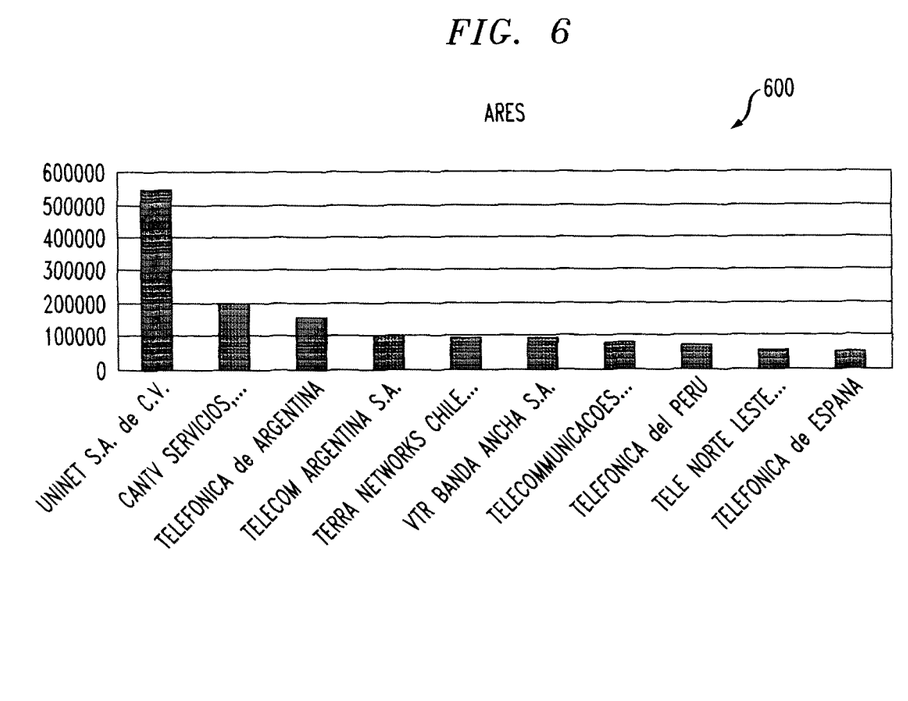

FIG. 6 illustrates an exemplary analysis 600 of the identified peers, based on the Internet Service Provider (ISP) of the respective peers. In particular, FIG. 6 illustrates the number of identified peers that use each ISP, for the ten most popular ISPs.

System and Article of Manufacture Details

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact) disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for identifying participants in a peer-to-peer network, comprising:
    sending a bootstrap request message using at least one network to at least one peer to discover one or more additional peers that were previously not identified;
    receiving, using the at least one network, a response from the at least one peer to the bootstrap request, wherein the response identifies one or more additional peers that were previously not identified;
    adding, using at least one hardware device, said one or more previously unidentified additional peers to at least one record stored in at least one memory comprising a listing of a group of peers to be contacted; and
    repeating the sending and receiving steps for the one or more additional peers in said group of peers in the at least one record stored in the at least one memory until the group of peers to be contacted in the at least one record stored in the at least one memory comprises an empty set for a predefined period of time.

2. The method of claim 1, wherein the sending step ensures that the at least one peer has not been previously contacted.

3. The method of claim 1, wherein the bootstrap request message comprises only one packet.

4. The method of claim 1, wherein the bootstrap request message requests that the recipient identify a predefined number of random peers.

5. The method of claim 1, further comprising the step of recording one or more of an IP address, a port and an identifier for each of the identified one or more additional peers.

6. The method of claim 1, further comprising the step of recording each of the identified one or more additional peers that were not previously known in a list.

7. The method of claim 6, further comprising the step of presenting the list of peers to a user.

8. The method of claim 6, further comprising the step of presenting the list of peers to a user based on one or more demographic criteria.

9. The method of claim 1, wherein at least one of the identified one or more additional peers are behind one or more of a network address translator (NAT) and a firewall.

10. A system for identifying participants in a peer-to-peer network, comprising:
    a memory; and
    at least one processor, coupled to the memory, operative to:
    send a bootstrap request message to at least one peer to discover one or more additional peers that were previously not identified;
    receive a response from the at least one peer to the bootstrap request, wherein the response identifies one or more additional peers;
    add said one or more previously unidentified additional peers to a group of peers to be contacted; and
    repeat the sending and receiving for the one or more additional peers in said group until the group of peers to be contacted comprises an empty set for a predefined period of time.

11. The system of claim 10, wherein the peer-to-peer network is an Ares network.

12. The system of claim 10, wherein the bootstrap request message is only sent to at least one peer that has not been previously contacted.

13. The system of claim 10, wherein the bootstrap request message comprises only one packet.

14. The system of claim 10, wherein the bootstrap request message requests that the recipient identify a predefined number of random peers.

15. The system of claim 10, wherein one or more of an IP address, a port and an identifier are recorded for each of the identified one or more additional peers.

16. The system of claim 10, wherein the processor is further configured to to present a list of the identified peers to a user.

17. An article of manufacture for identifying participants in a peer-to-peer network, comprising a tangible, non-transitory computer readable recordable storage medium containing one or more programs which when executed implement the steps of:
    sending a bootstrap request message using at least one network to at least one peer to discover one or more additional peers that were previously not identified;
    receiving, using the at least one network, a response from the at least one peer to the bootstrap request, wherein the response identifies one or more additional peers that were previously not identified;
    adding, using at least one hardware device, said one or more previously unidentified additional peers to at least one record stored in at least one memory comprising a listing of a group of peers to be contacted; and repeating the sending and receiving steps for the one or more additional peers in said group of peers in the at least one record stored in the at least one memory until the group of peers to be contacted in the at least one record stored in the at least one memory comprises an empty set for a predefined period of time.

18. The article of manufacture of claim 17, wherein the sending step ensures that the at least one peer has not been previously contacted.

19. The article of manufacture of claim 17, wherein the bootstrap request message comprises only one packet.

20. The article of manufacture of claim 17, wherein the bootstrap request message requests that the recipient identify a predefined number of random peers.

\* \* \* \* \*